United States Patent
Kalita et al.

(10) Patent No.: US 12,394,237 B2
(45) Date of Patent: Aug. 19, 2025

(54) SYSTEM AND METHOD FOR DATA EXTRACTION AND STANDARDIZATION USING AI BASED WORKFLOW AUTOMATION

(71) Applicant: Quantiphi Inc., Marlborough, MA (US)

(72) Inventors: Bhaskar Kalita, Marlborough, MA (US); Karthik Kumar Veldandi, Mumbai (IN); Alok Kumar Garg, Mumbai (IN); Sagar Kewalramani, Toronto (CA); Arunima Gautam, Marlborough, MA (US)

( * ) Notice: Subject to any disclaimer, the term of this patent is extended or adjusted under 35 U.S.C. 154(b) by 395 days.

(21) Appl. No.: 18/146,175

(22) Filed: Dec. 23, 2022

(65) Prior Publication Data
US 2024/0212379 A1    Jun. 27, 2024

(51) Int. Cl.
*G06V 30/412* (2022.01)
*G06V 10/82* (2022.01)
*G06V 30/19* (2022.01)

(52) U.S. Cl.
CPC ............ *G06V 30/412* (2022.01); *G06V 10/82* (2022.01); *G06V 30/19147* (2022.01)

(58) Field of Classification Search
None
See application file for complete search history.

(56) References Cited

U.S. PATENT DOCUMENTS

| | | |
|---|---|---|
| 11,244,203 B2 | 2/2022 | Zhong et al. |
| 11,798,301 B1 * | 10/2023 | Rimchala .......... G06V 30/19147 |
| 2021/0158093 A1 * | 5/2021 | Kaynig-Fittkau ...... G06V 10/82 |
| 2022/0121881 A1 | 4/2022 | Shaaban et al. |

* cited by examiner

*Primary Examiner* — Leon Flores
(74) *Attorney, Agent, or Firm* — RC Trademark Company

(57) ABSTRACT

Methods, systems and computer program products for generating standardized structured data from unstructured and semi-structured images of document pages is disclosed. The embodiments include a training framework where, boundaries of one or more instances of a first and a second set-of-fields are detected, from images of document pages and tagged using unique labels. Individual fields within the set-of-fields are identified and associated with each instance and the unique labels, to generate large number of synthetically labelled documents. A neural network model is trained using the original document image and the large number of generated synthetically labelled documents. An inference framework receives as input scanned images of unstructured and semi-structured document pages. Custom object recognition module identifies different set-of-fields, and an OCR module recognizes the text from the input images. The outputs of these modules are stitched together to create a standardized structured data.

18 Claims, 8 Drawing Sheets

Insurance Company of the West   Values as of 06/22/2020 04.11.25AM

|  |  |
|---|---|
| Insured | Company Name, Inc. |
| Policy Number | IMA 503521 04 |
| Policy Period | 01/01/2017 - 01/01/2018 |
| Agent | QuantIphl.com |

---

Claim number: 2104287   Client name: Lonnie B.Collfin   Age: 55   Claim Status: Closed/Indemnity

| | | | | |
|---|---|---|---|---|
| Class Code | 004204 | | Claim Examiner | Megan |
| Occupation | Personal Care Aide | | Ph. Number | (621) 852818 |
| Date of Injury | 08/31/2017 | | Email Address | ab@grp.com |
| Date Reported to carrier | 08/31/2017 | | | |
| Close Date | 10/13/2017 | | | |
| In Litigation | No | | | |
| Nature of Injury | Myocardial Interaction | | | |
| Body Part | Elbow | | | |
| Cause | ON ICE or SNOW | | | |
| Accident Discretion | Vehicle accident, lower back injury | | | |

| | Paid | Reserved | Total Incurred |
|---|---|---|---|
| Medical | $72.00 | $0.00 | $72.00 |
| Indemnity | $0.00 | $0.00 | $0.00 |
| Loss Adj. Exp | $7.63 | $0.00 | $7.63 |
| Rehab | $0.00 | $0.00 | $0.00 |
| Subrogation | $0.00 | $0.00 | $0.00 |
| Total | $79.63 | $0.00 | $79.63 |

---

Claim number: 2108756   Client name: Lonnie.B   Age: 55   Claim Status: Closed/Indemnity

| | | | | |
|---|---|---|---|---|
| Class Code | 004205 | Location | Abc, Group |  |
| Occupation | Mechanical Engineer | | 201 Cony Vis | |
| Date of Injury | 08/31/2017 | | Berryton, MN 36441 | |
| Date Reported to carrier | 08/31/2017 | | | |
| Close Date | 10/13/2017 | | Claim Examiner | Anthony |
| In Litigation | Yes | | Ph. Number | (418) 7440573 |
| Nature of Injury | Enucleation | | Email Address | cde@gm.com |
| Body Part | Finger | | | |
| Cause | Lifting | | | |
| Accident Discretion | Fell down, Inflammation to right knee | | | |

| | Paid | Reserved | Total Incurred |
|---|---|---|---|
| Medical | $76.00 | $0.00 | $76.00 |
| Indemnity | $0.00 | $0.00 | $0.00 |
| Loss Adj. Exp | $7.69 | $0.00 | $7.69 |
| Rehab | $0.00 | $0.00 | $0.00 |
| Subrogation | $0.00 | $0.00 | $0.00 |
| Total | $83.60 | $0.00 | $83.69 |

FIG. 6A

Insurance Company of the West    Values as of 06/22/2020 04.11.25AM

| Claim number:2104387 | | Client name: Lonnie B.Collfin | | Age:55 | Claim Status: Closed/Indemnity |
|---|---|---|---|---|---|

Class Code    004204    Location    XYZ & Family Insurance
Occupation    Personal Care Aide    358 Timothy Mill Apt. 567
Date of Injury    08/31/2017    New Jasonmouth, MA 14559
Date Reported to carrier    08/31/2017
Close Date    10/13/2017
In Litigation    No
Nature of Injury    Myocardial Interaction
Body Part    Elbow
Cause    ON ICE or SNOW
Accident Discretion    Vehicle accident, lower back injury

Claim Examiner Megan
Ph. Number (621) 852818
Email Address ab@grp.com

| | Paid | Reserved | Total Incurred |
|---|---|---|---|
| Medical | $72.00 | $0.00 | $72.00 |
| Indemnity | $0.00 | $0.00 | $0.00 |
| Loss Adj. Exp | $7.63 | $0.00 | $7.63 |
| Rehab | $0.00 | $0.00 | $0.00 |
| Subrogation | $0.00 | $0.00 | $0.00 |
| Total | $79.63 | | $79.63 |

Insured    Company Name,Inc.
Policy Number    IMA 503521 04
Policy Period    01/01/2017 -01/01/2018
Agent    QuantIphI.com

| Claim number:2108756 | | Client name: Lonnie.B | | Age:55 | Claim Status: Closed/Indemnity |
|---|---|---|---|---|---|

Class Code    004205    Location    Abc, Group
Occupation    Mechanical Engineer    201 Cony Vis
Date of Injury    08/31/2017    Berryton,MN 36441
Date Reported to carrier    08/31/2017
Close Date    10/13/2017
In Litigation    Yes
Nature of Injury    Enucleation
Body Part    Finger
Cause    Lifting
Accident Discretion    Fell down, Inflammation to right knee

Claim Examiner Anthony
Ph. Number (418) 7440573
Email Address cde@gm.com

| | Paid | Reserved | Total Incurred |
|---|---|---|---|
| Medical | $76.00 | $0.00 | $76.00 |
| Indemnity | $0.00 | $0.00 | $0.00 |
| Loss Adj. Exp | $7.69 | $0.00 | $7.69 |
| Rehab | $0.00 | $0.00 | $0.00 |
| Subrogation | $0.00 | $0.00 | $0.00 |
| Total | $83.60 | | $83.69 |

FIG. 6B

Insurance Company of the West   Values as of 06/22/2020   04.11.25AM

|                       | Company Name, Inc.                |
|-----------------------|-----------------------------------|
| Insured               | Company Name, Inc.                |
| Policy Number         | IMA 503521 04                     |
| Policy Period         | 01/01/2017 - 01/01/2018           |
| Agent                 | Quantlphl.com                     |

Claim number: 2104387   Client name: Lonnie B.Collfin   Age: 55   Claim Status: Closed/Indemnity

| Class Code           | 004204                                                              |
| Occupation           | Personal Care Aide                                                  |
| Date of Injury       | 08/31/2017                                                          |
| Date Reported to carrier | 08/31/2017                                                      |
| Close Date           | 10/13/2017                                                          |
| In Litigation        | No                                                                  |
| Nature of Injury     | Myocardial Interaction                                              |
| Body Part            | Elbow                                                               |
| Cause                | ON ICE or SNOW                                                      |
| Accident Discretion  | Vehicle accident, lower back injury                                 |

Location: XYZ & Family Insurance, 358 Timothy Mill Apt. 567, New Jasonmouth, MA 14559

Claim Examiner: Megan
Ph. Number: (621) 852818
Email Address: ab@grp.com

|             | Paid    | Reserved | Total Incurred |
|-------------|---------|----------|----------------|
| Medical     | $72.00  | $0.00    | $72.00         |
| Indemnity   | $0.00   | $0.00    | $0.00          |
| Loss Adj. Exp | $7.63 | $0.00    | $7.63          |
| Rehab       | $0.00   | $0.00    | $0.00          |
| Subrogation | $0.00   | $0.00    | $0.00          |
| Total       | $79.63  | $0.00    | $79.63         |

Claim number: 2108756   Client name: Lonnie.B   Age: 55   Claim Status: Closed/Indemnity

| Class Code           | 004205                                                              |
| Occupation           | Mechanical Engineer                                                 |
| Date of Injury       | 08/31/2017                                                          |
| Date Reported to carrier | 08/31/2017                                                      |
| Close Date           | 10/13/2017                                                          |
| In Litigation        | Yes                                                                 |
| Nature of Injury     | Enucleation                                                         |
| Body Part            | Finger                                                              |
| Cause                | Lifting                                                             |
| Accident Discretion  | Fell down, Inflammation to right knee                               |

Location: Abc, Group, 201 Cony Vis, Berryton, MN 36441

Claim Examiner: Anthony
Ph. Number: (418) 7440573
Email Address: cde@gm.com

|             | Paid    | Reserved | Total Incurred |
|-------------|---------|----------|----------------|
| Medical     | $76.00  | $0.00    | $76.00         |
| Indemnity   | $0.00   | $0.00    | $0.00          |
| Loss Adj. Exp | $7.69 | $0.00    | $7.69          |
| Rehab       | $0.00   | $0.00    | $0.00          |
| Subrogation | $0.00   | $0.00    | $0.00          |
| Total       | $83.60  | $0.00    | $83.69         |

| Claim Number | Class code | Occupation | Date of injury | Body Part | " |
|--------------|------------|------------|----------------|-----------|---|
|              | 704 a      |            |                |           |   |
|              | 704 b      |            |                |           |   |

FIG. 7

SYSTEM AND METHOD FOR DATA EXTRACTION AND STANDARDIZATION USING AI BASED WORKFLOW AUTOMATION

TECHNICAL FIELD

The present disclosure is generally related to a system and method for data extraction and standardization; and more specifically, to a system and method for unstructured and semistructured data extraction and generating standardized data from loss-run documents using AI/neural network-based workflow automation.

BACKGROUND

Banking and Insurance sector is largely moving digital. Organizations have a duty of care to ensure that their systems are steadfast and impervious. Big data is the industry standard, and every sector is working on the repositories of unstructured data to unearth meaningful insights. Big data applications in banking are already transforming the industry. Artificial intelligence comes to help by not only utilizing the benefits of AI in extracting and structuring the data in hand, finance, and banking sectors are stepping in to use this data to improve customer relations.

Much like credit scores allow banks to determine whether you're a good candidate for a bank loan or credit card, loss runs allow insurers to assess how risky your business will be to insure. By requesting your loss runs, an insurer can review, the type of claims you've filed in the past, the financial impact of your claims (settlement costs) and the frequency of your prior claims amongst other insights related to your insurance claims.

Portable Document Format (PDF) documents are ubiquitous with most of the digital documents are available in this format. While these can be easily understood by human and the content comprehended, automatic processing of these documents is difficult because understanding document layout and extracting information using this format is complicated. While optical character recognition (OCR) methods are widely used to understand these documents, they fail to recognize or extract data in various document elements, such as tables and any relationship between the tables.

Deep learning using image analysis techniques are available to help mitigate the above problem; however, they require huge amount of data as input to train a neural network model to function accurately. Furthermore, the complex nature of document layouts and elements has mandated human intervention to manually review and annotate the PDF documents and to label the document elements. Manual annotation is a time taking and cumbersome process, that results in a smaller number of annotated documents for training purposes. This in turn results in a less efficient and less accurate machine learning based AI/neural network model for data extraction and standardization of structured data.

Therefore, there exists a need of a system and a method for data extraction and standardization of structured data that is capable of tagging elements in a document layout, identifying multiple instances of such tagged elements, generating large number of training data set using the available documents for training a neural network or machine learning model and use the trained neural network to efficiently and accurately extract data and standardized them into structured data.

SUMMARY

The present disclosure seeks to provide a system and a method for data extraction and standardization of structured data.

The object of the present disclosure is to provide a system and a method for data extraction and standardization of structured data that overcomes the problems encountered in the prior art. Moreover, the present disclosure seeks to provide solution to an existing technical problem of creating a standardized structured data for reuse.

In an aspect, embodiments of the present disclosure provide a method for data extraction and standardization of data from unstructured and semi-structured document page images, the method comprising:
  detecting boundaries of one or more instances of a first set-of-fields from a document page image;
  detecting boundaries of one or more instances of a second set-of-fields from the document page image;
  wherein the document page image is from a group including, an unstructured document page image, a semi-structured document page image, a structured document page image or a web page image;
  tagging using unique labels, the detected boundaries of the one or more instances of the first set-of-fields and the one or more instances of the second set-of-fields;
  identifying each individual field from the one or more instances of the first set-of-fields and one or more instances of the second set-of-fields;
  generating plurality of synthetic documents using each individual field from the one or more instances of the first set-of-fields, one or more instances of the second set-of-fields and the unique labels; and
  training a neural network model using the generated plurality of synthetic documents along with the original document pages.

The present disclosure is advantageous in terms of providing efficient, accurate, and automated relevant structured data from unstructured and semi-structured document page images.

Optionally, the method for data extraction and standardization of data is configured to standardize data pertaining to document page images of loss run documents, document page images of banking documents, document page images of insurance industry.

Optionally, the method for data extraction and standardization of data is configured to generate plurality of synthetic documents.

Optionally, generating plurality of synthetic documents is done by establishing a one-to-many relationship between each individual field from the one or more instances of the first set-of-fields.

Optionally, generating plurality of synthetic documents is done by establishing a one-to-many relationship between each individual field from the one or more instances of the first set-of-fields and the one or more instance of the second set-of-fields.

Optionally, each individual field comprises a name, age, gender, occupation, claim no, class code, date of injury, date reported to carrier, close date, body part, nature of injury, cause, location, medical, indemnity, rehab, paid, reserved and other fields generally found in a loss run document or a banking document or an insurance document.

Optionally, the method for data extraction and standardization of data is configured to use the trained neural network model to identify in real time, one or more instances of the first set-of-fields and one or more instances of second set-of-fields.

Optionally, identifying in real time comprises, identifying the one or more instances of the first and the second set-of-fields from new document page images provided as input to the neural network model.

Optionally, the first set-of-fields and the second set-of-fields is a subset of an overall set-of-fields available in a document page image.

Optionally, detecting boundaries of one or more instances of the first and second set-of-fields comprises, detecting repetition of the first set-of-fields and the second set-of-fields, more than once in the document page image.

Optionally, the method for data extraction and standardization of data is configured to detect boundaries of a third set-of-fields, a fourth set-of-fields depending on the layout and elements present in the image of the unstructured and semi structured document pages.

Optionally, the method for data extraction and standardization of data is configured to tag the detected boundaries, generate synthetic documents from the third set-of-fields, the fourth set-of-fields depending on the layout and elements present in the image of the unstructured and semi structured document pages.

Optionally, the method for data extraction and standardization of data is configured to utilize Optical Character Recognition (OCR) method to detect boundaries of the first set-of-fields, the second set-of-fields, the third set-of-fields and/or the fourth set-of-fields.

In a second aspect, embodiments of the present disclosure describe a system for data extraction and standardization of data, the system comprising:

a training framework;
        wherein the training framework comprises a document repository module, a tagging module, a synthetic data generation module and a neural network model;
        wherein the document repository module stores images of document pages including images of an unstructured document pages, images of a semi-structured document pages, images of a structured document pages, images of web pages;
        wherein the tagging module is configured to tag using unique labels a first set-of-fields and a second set-of-fields from the images of document pages;
        wherein the synthetic data generator module is configured to generate plurality of synthetically labelled documents from the first set-of-fields, the second set-of-fields and the unique labels;
        wherein the neural network model is trained using the generated plurality of synthetically labelled documents along with the original document pages;
    an inference framework;
        wherein the inference framework comprises a custom object detection module, an OCR module, a post processing module and a data standardization module;
        wherein the custom object detection module is configured to identify one or most instances of the first set-of-fields and one or most instances of the second set-of-fields using the trained neural network model;
        wherein the OCR module is configured to recognize text from the images of unstructured and semi-structured document pages;
        wherein the post processing module is configured to stitch together the output of the custom object detection module and the OCR module;
        wherein the data standardization module is configured to use the stitched output from the post processing module to create a standardized structured data.

Optionally, the synthetic data generator module of the system establishes a one-to-many relationship between each individual field in the first set-of-fields to generate the plurality of synthetically labelled documents.

Optionally, the synthetic data generator module of the system establishes a one-to-many relationship between each individual field in the first set-of-fields and each individual field in the second set-of-fields to generate the plurality of synthetically labelled documents.

Optionally, the post processing module of the system stitches the output by, associating the recognized text from the OCR module to each individual field in the one or more instances of the first set-of-fields and the one or more instances of the second set-of-fields.

Optionally, the data standardization module of the system creates the standardized structured data using the association between the recognized text and each individual field from the one or more instances of the first set-of-fields and the one or more instances of the second set-of-fields.

Optionally, the OCR module of the system parses the images of the document page to recognize text.

In a third aspect, embodiments of the present disclosure describe a computer readable storage medium having computer executable instructions for execution on a computer system, that when executed by a computer causes the computer system to execute the method steps of data extraction and standardization comprising:

detecting boundaries of one or more instances of a first set-of-fields from images of a document page;
    detecting boundaries of one or more instances of a second set-of-fields from images of a document page;
    providing an interface to tag the detected boundaries of the one or more instances of the first set-of-fields and the one or more instances of second set-of-fields using unique labels;
    identifying each individual field from the one or more instances of the first set-of-fields and the one or more instances of the second set-of-fields;
    generating plurality of synthetic documents using each individual field from the one or more instance of the first set-of-fields, one or more instance of the second set-of-fields and the unique labels; and
    training a neural network model using the generated plurality of synthetic documents along with the original document pages.

Optionally, the computer readable storage medium enables generating the plurality of synthetic documents by establishing a one-to-many relationship between each individual field from the one or more instances of the first set-of-fields.

Optionally, the computer readable storage medium enables generating the plurality of synthetic documents by establishing a one-to-many relationship between each individual field from the one or more instances of first set-of-fields and the one or more instances of the second set-of-fields.

Optionally, the computer readable storage medium enables using the trained neural network model to identify in real time, one or more instances of the first set-of-fields, one or more instances of second set-of-fields.

Optionally, the first set-of-fields and the second set-of-fields is a subset of an overall set-of-fields available in an image of the document page.

Optionally, detecting boundaries of one or more instances of the first and second set-of-fields comprises, detecting repetition of the first set-of-fields and the second set-of-fields, more than once in the document page image.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 6A is a schematic illustration of an image 600 of a document page along with the first set-of-fields, second set-of-fields and individual fields.

FIG. 6B is a schematic illustration of an image 600 of a document page along with the plurality of synthetically generated documents.

FIG. 7 is a schematic illustration of creating a structured data from the first set-of-fields, the second set-of-fields and individual fields.

Figure 1:
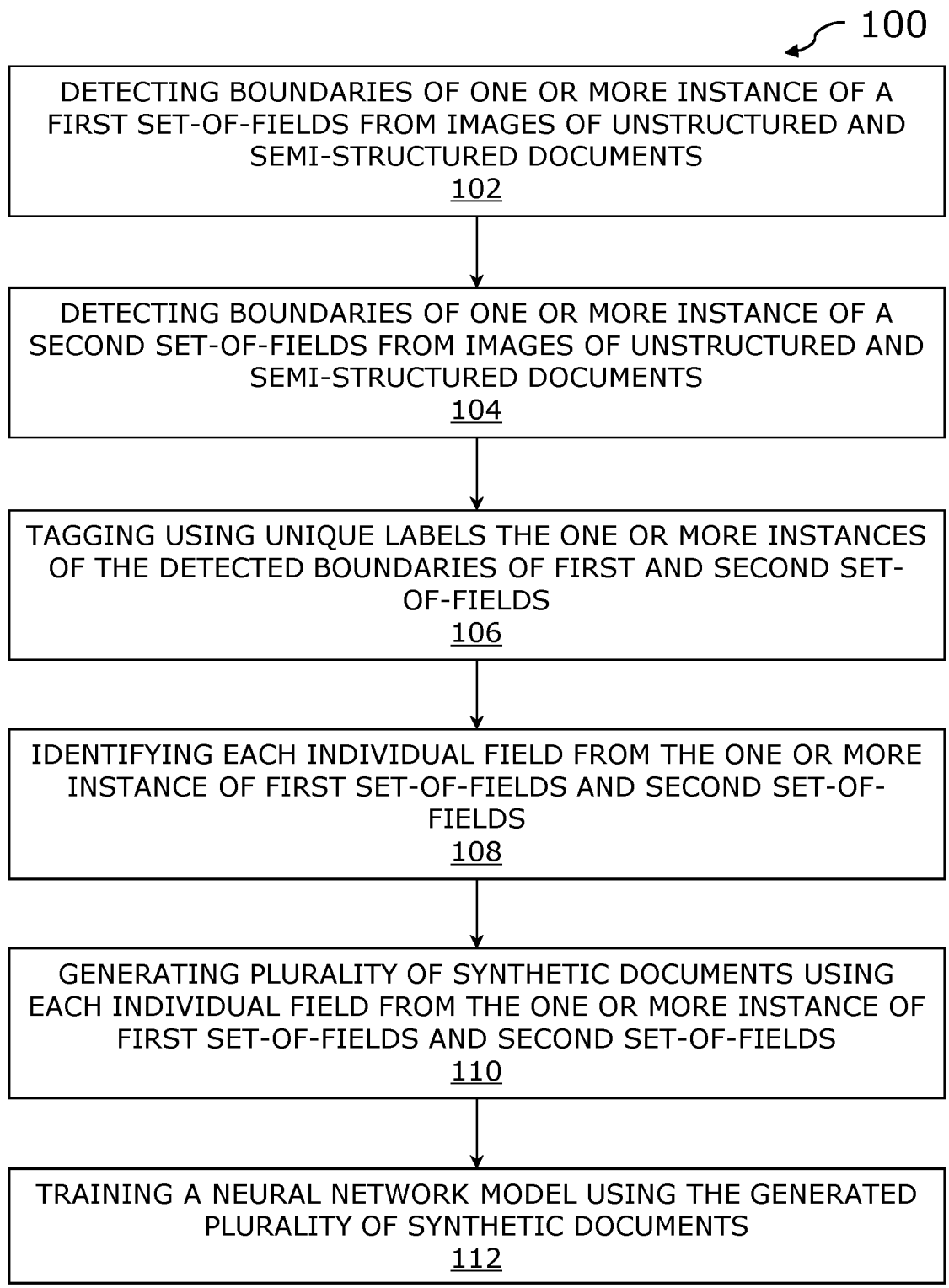
FIG. 1 is a flowchart illustrating an overall method 100 for data extraction and standardization of data from images of unstructured and semi-structured document pages

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and the ways in which they can be implemented. Although some modes of carrying out the present disclosure have been disclosed, those skilled in the art would recognize that other embodiments for carrying out or practicing the present disclosure are also possible.

The terms "a" and "an" herein do not denote a limitation of quantity, but rather denote the presence of at least one of the referenced items. The terms "having", "comprising", "including", and variations thereof signify the presence of a component.

In an aspect, embodiments of the present disclosure provide a method for data extraction and standardization of data from unstructured and semi-structured document page images, the method comprising:
  detecting boundaries of one or more instances of a first set-of-fields from a document page image;
  detecting boundaries of one or more instances of a second set-of-fields from the document page image;
  wherein the document page image is from a group including, an unstructured document page image, a semi-structured document page image, a structured document page image or a web page image;
  tagging using unique labels, the detected boundaries of the one or more instances of the first set-of-fields and the one or more instances of the second set-of-fields;
  identifying each individual field from the one or more instances of the first set-of-fields and one or more instances of the second set-of-fields;
  generating plurality of synthetic documents using each individual field from the one or more instances of the first set-of-fields, one or more instances of the second set-of-fields and the unique labels;
  training a neural network model using the generated plurality of synthetic documents along with the original document pages.

In another aspect, the embodiments of the present disclosure provide a system for data extraction and standardization of data from unstructured and semi-structured documents page images comprising;
  a training framework;
    wherein the training framework comprises a document repository module, a tagging module, a synthetic data generation module and a neural network model;
    wherein the document repository module stores images of document pages including images of an unstructured document pages, images of a semi-structured document pages, images of a structured document pages, images of web pages;
    wherein the tagging module is configured to tag using unique labels a first set-of-fields and a second set-of-fields from the images of document pages;
    wherein the synthetic data generator module is configured to generate plurality of synthetically labelled documents from the first set-of-fields, the second set-of-fields and the unique labels;
    wherein the neural network model is trained using the generated plurality of synthetically labelled documents along with the original document pages;
  an inference framework;
    wherein the inference framework comprises a custom object detection module, an OCR module, a post processing module and a data standardization module;
    wherein the custom object detection module is configured to identify one or most instances of the first set-of-fields and one or most instances of the second set-of-fields using the trained neural network model;
    Wherein the OCR module is configured to recognize text from the images of unstructured and semi-structured document pages;

Wherein the post processing module is configured to stitch together the output of the custom object detection module and the OCR module;

wherein the data standardization module is configured to use the stitched output from the post processing module to create a standardized structured data.

In yet another aspect, the embodiments of the present disclosure provide a computer readable storage medium having computer executable instructions for execution on a computer system, that when executed by a computer causes the computer system to execute the method steps of data extraction and standardization comprising;

detecting boundaries of one or more instances of a first set-of-fields from images of a document page;

detecting boundaries of one or more instances of a second set-of-fields from images of a document page;

providing an interface to tag the detected boundaries of the one or more instances of the first set-of-fields and the one or more instances of second set-of-fields using unique labels;

identifying each individual field from the one or more instances of the first set-of-fields and the one or more instances of the second set-of-fields;

generating plurality of synthetic documents using each individual field from the one or more instance of the first set-of-fields, one or more instance of the second set-of-fields and the unique labels; and training a neural network model using the generated plurality of synthetic documents along with the original document pages.

The present disclosure provides a system and a method to extract structured data from images of document pages. The structured data can be a tabular format or any other format having a well-defined relationship between the data both syntactically and semantically. The system has a training framework, wherein, images of document pages are stored in a document repository. The documents are generally stored in a portable document format (PDF). However, it should be noted that documents can be stored in other document formats for e.g., XML paper specification (XPS). The images of documents stored in the document repository are scanned using OCR technology and one or more set-of-fields are identified. If there are plurality of instances of each set-of-fields, all such instances of each set-of-fields are identified. Each instance of the one or more set-of-fields is tagged using a unique label. Each individual field of each set-of-fields corresponds to an entity. The individual field from a first set-of-fields and a second set-of-fields, and the unique labels are used to generate large number of synthetically labelled documents. These synthetically labelled documents along with the original document is then used to train a neural network model. It should be noted that, the problem of having small number of training documents to train the neural network model is mitigated by generating large number of synthetically labelled documents. Thus, the neural network model is trained to be more efficient and accurate than existing models.

Throughout the present disclosure, the term "system" refers to an integrated computing system with a plurality of components such as at least one training framework, at least one inference framework for data extraction and standardization of structured data.

As used herein, the term "Structured data" refers to data that has a well-defined structure. The data is preferably associated in a table format with multiple rows and columns as an example of well-defined structure. The columns are generally named with headers that define each individual field from the first and/or second set-of-fields and each rows have the corresponding value associated with the headers. It should be noted that, table format is used as an example of a structured data format and other format having a well-defined structure such as excel files and SQL database can also be used.

As used herein, the term "data extraction" refers to a method where data is extracted from unstructured and/or semi-structured data pages. The image (non-editable) format of the unstructured and/or semi-structured data pages are stored in a document repository. The document repository is preferably a storage device capable of storing large volume of data. Examples of storage device capable of storing large volume of data is generally well known in the art. The images of the unstructured and/or semi-structured data pages are parsed to extract text. The extracted texts are further analyzed and relationship between the texts are formed. These relationships are utilized to form a meaningful association between the extracted text and stored in a structed data format.

As used herein, the term "training framework" refers to a framework which has components that functions to train a neural network model. More specifically, the training framework comprises of a document repository module that is capable of storing large volume of unstructured and/or semi-structured document pages. The data is stored as images of document pages. The images of document pages are scanned, and the text recognized. The recognized text is then used to identify one or more set-of-fields. If there are repetitions of the set-of-fields in a document page, then each instance of the one or more set-of-fields is identified. The one or more set-of-fields is tagged using unique labels. A synthetic data generator module then utilizes the tagged labels and the one of more set-of-fields to generate a large volume of synthetically labelled documents. These synthetically labelled documents along with the original document is used to train a neural network model.

As used herein, the term "inference framework" refers to a framework that has components that utilizes the trained neural network to identify the one of more set-of-fields and subsequently creation of structured data from the one of more-set-of-fields. A custom object detection module is utilized to identify the set-of-fields and an OCR module is utilized to recognize the text. The output of these two modules is stitched together in a post processing module, i.e., the recognized text from the OCR module is associated with each individual field in the one or more instances of the first set-of-fields and the one or more instances of the second set-of-fields. Each individual field is then identified based on this association and then used to generate standardized structured data.

As used herein, the term "set-of-fields" refers to a group of fields which is present in an image of an unstructured or semi-structured document page. A first set-of-field represents a particular pre-defined set of individual fields, and a second set-of-fields represents another different pre-defined set of individual fields. An image of a document page can have one or more instances of the first set-of-fields and the second set-of-fields. It should be noted that, the number of set-of-fields is not limited and depending on the type and layout of the image of the document page, there can be more than two set-of-fields. For instance, there could be a third or fourth set-of-fields depending on the type and layout of the image of document page. Further there could be multiple instances of each of the set-of-fields. It should also be noted that, each set-of-field is a subset of overall fields available in an image of the document image. Further, detecting boundaries of one or more instances of the first and second set-of-fields comprises, detecting repetition of the first set-of-fields and the second set-of-fields, more than once in the document page image.

As used herein, the term "tagging using unique labels" refers to a method to uniquely identify each instance of the one or more set-of-fields. For e.g., a first instance of a first set-of-fields could be tagged with a label of "FSOF1" and the second instance of the first set-of-fields could be tagged using the label "FSOF2". Similarly, the second and subsequent set of fields are tagged using unique labels so as to distinguish them from each other. It should be noted that, the set-of-fields is tagged with labels to uniquely identify each instance of the one or more set-of-fields. It should be noted that, any type of labelling can be used to uniquely identify each instance of the one or more set-of-fields, without deviating from the spirit and scope of the invention. Further, these labels are used along with each individual field in the one or more set-of-fields while generating the synthetically labelled documents.

As used herein, the term "synthetically labelled documents" refers to the large number of synthetic documents generated from the original document page image. Each individual field from the first set-of-fields is identified and is associated with individual fields from the other instances of the first set-of-fields. Each association is then generated as a document image and stored in the document repository. The generated documents are then tagged using labels. A one-to-many relationship is formed by such an association. Further, individual fields from the one or more instance of the first set-of-fields and the one or more instance of the second set-of-fields are also associated in similar manner and synthetic documents generated. Thus, from an image of a single original document page, multiple synthetically labelled documents are generated with each document having a distinct association with the original document page. The term synthetic is used herein to distinguish the generated document form the original document and any such term like artificial, simulated, imitated, replicated etc., can be used to distinguish the generated document without deviating from the spirit and scope of the invention. It should also be noted that, the reason for generating such synthetic documents is to utilize them to train the neural network model with large number of training data. Associating individual fields between the one or more instance of the first and second set-of-fields is one of the mechanisms used to form a one-to-many relationship between the documents and should not be construed to limiting the scope of the invention. Any type of association, like linking or combining can also be used to generate the large number of documents for training, without deviating from the scope of the invention.

As used herein, the term "Neural network model" refers to a machine learning model trained using the training data created by embodiments of the present invention. Deep neural networks need to be trained with a very large number of diverse samples and the synthetically labelled documents provide such a large number of training data. The neural network model is based on Convolution Neural Network (CNN). More specifically, it is a feed forward CNN. The hidden layer(s) of the CNN helps in feature extraction, i.e., identifying plurality of instances of the one or more set-of-fields. The output layer helps in identifying the plurality of instances of the one or more set-of-fields from an input document in real time. Once the model is trained using the synthetically labelled document along with the image of the original document page, images of new documents can be provided as input to the trained model and the one or more set of fields identified in the image of the new document. The identified set of fields is then used to generated structured data.

DETAILED DESCRIPTION OF DRAWINGS

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Referring to FIG. 1 is a flowchart illustrating the overall method 100 for data extraction and standardization of data from images of unstructured and semi-structured document pages. As shown, the method 100 comprises steps 102, 104, 106, 108, 110, and 112. At step 102, the method comprises detecting boundaries of a first set-of-fields from images of unstructured and semi-structured documents. The images of the unstructured and semi-structured documents are scanned using OCR scanning technique to enable detection of boundaries. After scanning the images, the scanned documents are parsed to identify the first set-of-fields that are related to each other or have some common relationship amongst each other. The relationship can comprise a claim no, an insured name, an insurance entity etc. The unstructured and semi-structured documents are stored in a document repository. Further, there can be multiple instances of the first set-of-field in a single image of the unstructured and semi-structured document, and boundaries of all such instances of the first set-of-field is identified from the image of the document page. At step 104, the method comprises detecting boundaries of a second set-of-fields from images of unstructured and semi-structured documents. It should be noted that, the first set-of-field is different from the second set-of-field. Also, boundaries of multiple instances, if any, of the second set-of-field is also detected. At step 106, the method comprises tagging the multiple instances of the first set-of-field and the second set-of-fields using unique labels. The unique labels help in distinguishing the set-of-fields. At step 108, each individual field from the first and the second set-of-fields is identified by parsing the set-of-fields. Further, if there are multiple instances of the first or the second set-of-fields, individual fields from each of the instance is also identified. At step 110, synthetically labelled documents are generated using the individual fields from the first and second set-of-fields. This is done by using a one-to-many association between the individual fields in the plurality of instances of the first and the second set-of-fields. At step 112, a neural network model is trained using the synthetically generated documents along with the image of the original unstructured and/or semi-structured document page. Preferably, the neural network model is a feed forward convolution neural network (CNN) model.

Figure 2:
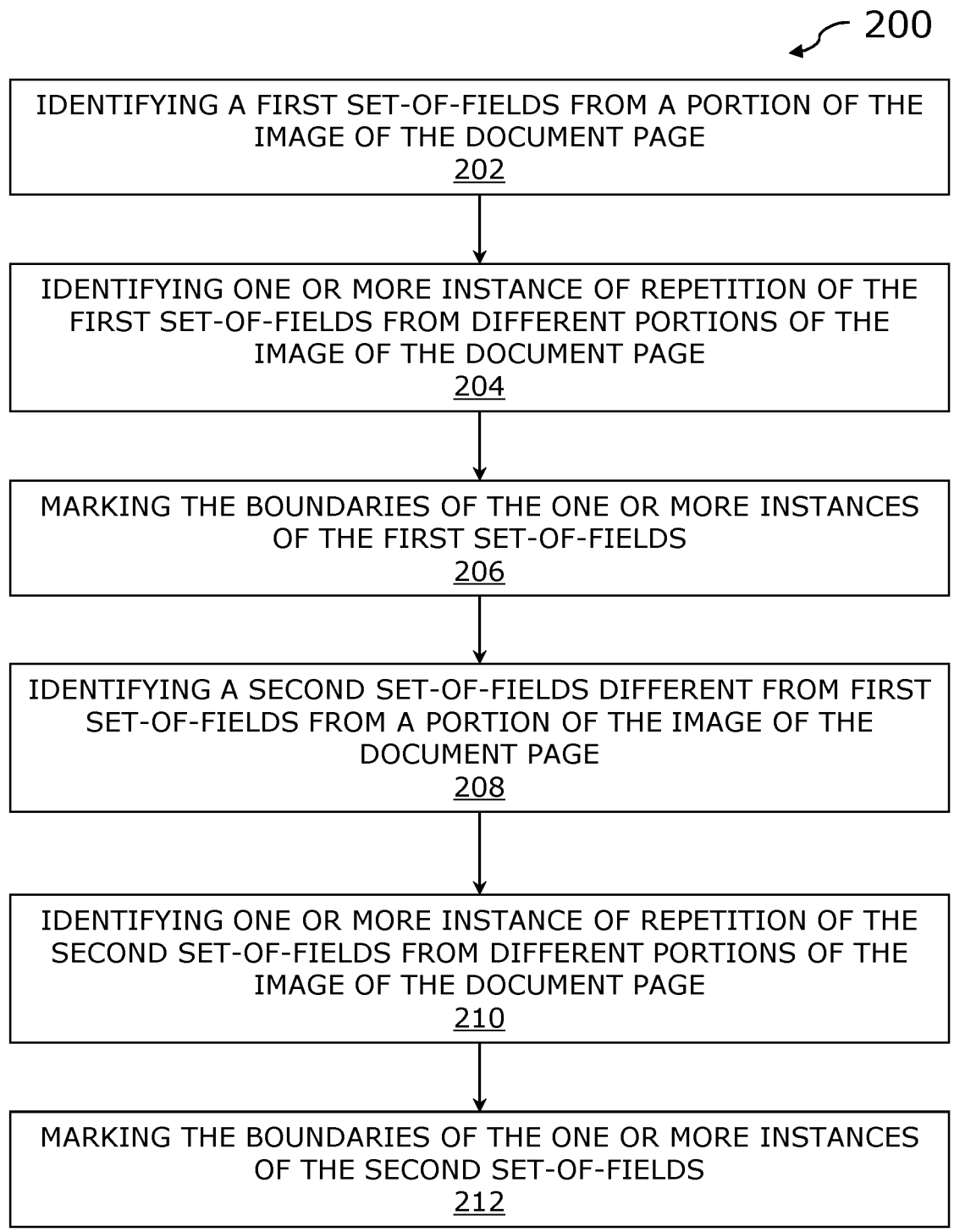
FIG. 2 is a schematic illustration of a method 200 for detecting boundaries of the one or more instances of the first set-of-fields and second set-of-fields.

FIG. 2 is a schematic illustration of a method 200 for detecting boundaries of the one or more instances of the first set-of-fields and second set-of-fields. As shown, the method 200 comprises steps 202, 204, 206, 208, 210, and 212. At step 202, a first set-of-field is identified from a portion of an image of unstructured and/or semi-structured document page. The first set-of-field is a group of fields that are associated with each other. At step 204, if there are repetitions of the first set-of-fields at a different portion of the image of the unstructured and/or semi-structured document page, these repetitions, or instances of the first set-of-fields are also identified. At step 206, boundaries of each instance of the first set-of-fields are marked manually or automatically. The boundaries are marked such that, all the individual fields in the first set-of-fields are bounded within the marked boundary. At step 208, a second set-of-field is identified from a portion of an image of unstructured and/or semi-structured document page. The second set-of-field is a group of fields that are associated with each other. At step 204, if there are repetitions of the second set-of-fields at a different portion of the image of the unstructured and/or semi-structured document page, these repetitions, or instances of the second set-of-fields are also identified. At step 206, boundaries of each instance of the second set-of-fields are marked manually or automatically. The boundaries are marked such that, all the individual fields in the second set-of-fields are bounded within the marked boundary.

Figure 3:
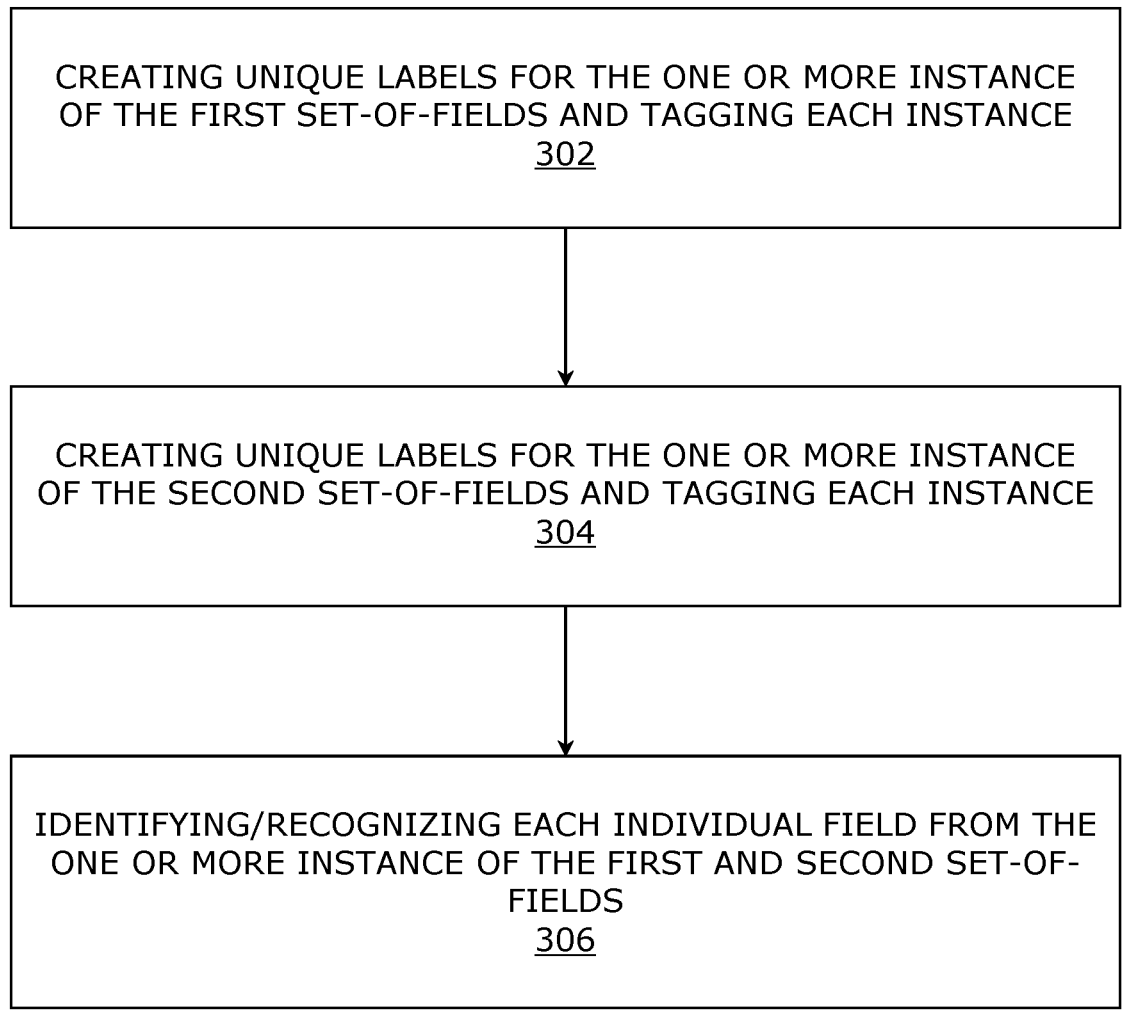
FIG. 3 is a schematic illustration of the method 300 for creating unique labels and identifying individual fields from the first and second set-of-fields.

FIG. 3 is a schematic illustration of the method 300 for creating unique labels and identifying individual fields from the first and second set-of-fields. As shown, the method 300 comprises steps 302, 304 and 306. At step 302, each instance of the identified first set-of-fields is tagged using a unique label. For e.g., the labels can be marked as "FSOF1", "FSOF2" and so on, for each identified instance of the first set-of-fields. The above labels are just an example notation, and it should be noted that any labelling mechanism can be used so long as they are able to uniquely distinguish each instance of the first set-of-fields. At step 304, each instance of the identified second set-of-fields is tagged using a unique label. For e.g., the labels can be marked as "SSOF1", "SSOF2" and so on. At step 306, individual fields from each of the first and second set-of-fields is identified by parsing the first and second set-of-fields. Examples of individual fields are age, gender, occupation, claim no, class code, date of injury, date reported to carrier, close date, body part, nature of injury, cause, location, medical, indemnity, rehab, paid, reserved. It should be noted that depending on the type of document being parsed the individual fields and hence the first and second set-of-fields may vary, and the above examples should not be construed to be limiting the scope of the invention.

Figure 4:
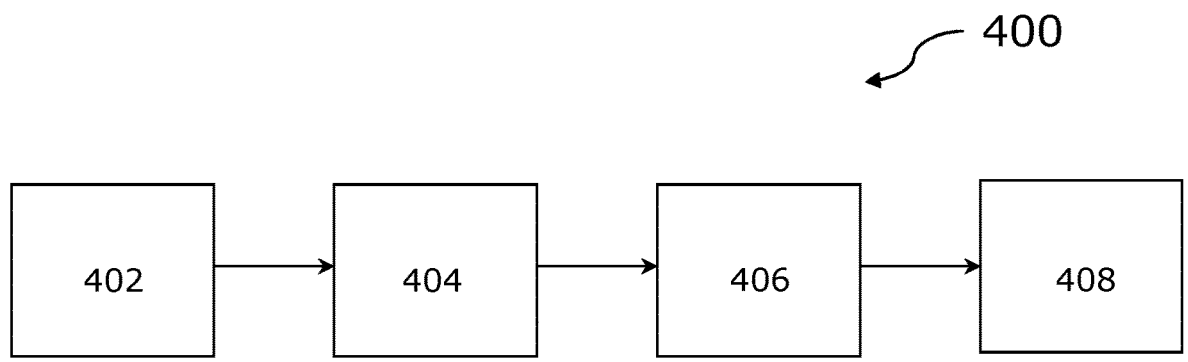
FIG. 4 is a schematic illustration of a system 400 of a training framework.

FIG. 4 is a schematic illustration of a system 400 of a training framework in accordance with an embodiment of the present disclosure. As shown, the system 400 comprises a document repository module 402. The document repository module 402 is used to store images of unstructured and semi-structured document page that are used in training a neural network. The document repository can be secondary storage devices like an HDD or SSD's, a cloud database, a distributed ledger, etc., or a type of database management system such as, SQL®, Ruby®, and the like, an optical storage device. A tagging module 404 is configured to parse the images of document pages stored in the document repository 402. Multiple instances of a first and a second set-of-fields are identified as a result of parsing the images of document pages. The identified multiple instances of the set-of-fields are then tagged using unique labels by the tagging module 404. A synthetic data generator module 406, generates a plurality of synthetically labeled documents from the identified first and second set-of-fields and the unique labels. Each individual field from the multiple instances of the one or more set-of-fields is identified. The individual field from the first set-of-fields is identified and is associated with individual fields from the other instances of the first set-of-fields. Each association is then generated as a document image and stored in the document repository. A one-to-many relationship is formed by such an association. Further, individual fields from the one or more instance of the first set-of-fields and the one or more instance of the second set-of-fields are also associated in similar manner and synthetic documents generated. Also, the individual fields from the second set of fields can be associated with all the fields of all the instances of first set of fields causing a one-to-many relationships between a few specific fields. Thus, from an image of a single original document page, multiple synthetically labelled documents are generated with each document having a distinct association with the original document page. A neural network model 408 is then trained using the generated synthetically labelled document and also the images of unstructured and semi-structured document pages. A feed forward convolution based neural network model is preferably employed. However, other type of artificial neural network model can be used without deviating from the spirit and scope of the invention.

Figure 5:
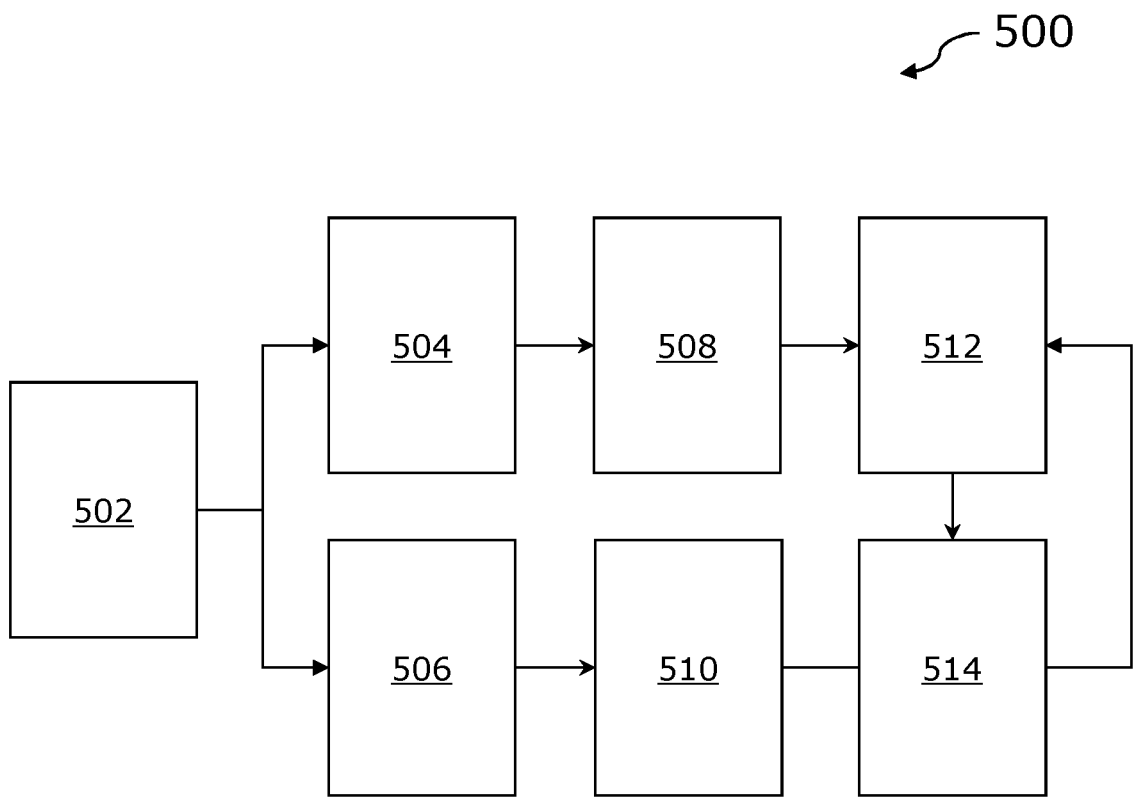
FIG. 5 is a schematic illustration of a system 500 of an inference framework.

FIG. 5 is a schematic illustration of a system 500 of an inference framework in accordance with an embodiment of the present disclosure. As shown, the system 500 comprises scanning PDF copies of unstructured and/or semi-structured documents in to scanned images and storing the scanned images in a database 502. The scanned images are then processed by a custom object detection module 504 and OCR module 506. The custom object detection module 504, identifies one or more set-of-fields from the scanned images. A neural network model (408 with reference to FIG. 4) that is trained using the generated plurality of synthetically labelled documents is used in identifying the one or more set-of-fields. Based on the trained model, inference, and identification of the one or more set-of-fields is done in real time with the scanned images as input. Further, if there are multiple instances of a particular set-of-fields, all such instances are identified by the custom object detection module. The output of the custom object detection module is stored in a storage module 508. Further, the scanned images are processed by an OCR module 506. The output of the OCR module is the text recognized from the images of scanned document pages. The document with recognized text is stored in a storage module 510. A post-processing module 512, takes as input the stored output of the custom object detection module and the stored output of the OCR module and stitches this output together. In an embodiment, the recognized text from the OCR module is associated with each individual field in the one or more instances of the first set-of-fields and the one or more instances of the second set-of-fields. Each individual field is then recognized/identified based on this association and then used to generate standardized structured data 514. The structured data is preferably extracted in a tabular format. However, any other format having a well-defined relationship between the data, both syntactically and semantically and forming a well-defined structure, can be utilized to extract the data is a structured format.

FIG. 6A is a schematic illustration of an image 600 of a document page along with the first set-of-fields, second set-of-fields and individual fields. As shown, the image 600 of the document page comprises of first set-set-fields 602. As can be seen, as an exemplary embodiment two instances of the first set-of-field is shown. However, it should be noted that, there can be multiple instances of the first set-of-fields in an image of a document page and boundaries of all such instances are detected and marked. Further, a second set-of-fields 604 is also identified in the image 600 of the document page. As can be seen in the figure, only one instance of the second set-of-field has been shown for clarity purposes, however, all such instances of the second set-of-fields are identified. Also, for clarity purposes, only first and second set-of-fields have been shown in the illustration and it should be noted that, there can be more than two set-of-fields than can be identified based on the type and layout of the image of document page. Further, individual fields 606 are identified by parsing the image of the document page. As can be seen, only two such individual fields have been shown for clarity purposes from the first instance of the first set-of-field. The individual fields can be identified from each instance of the first set-of-fields and each instance of the second set-of-fields. These individual fields are then associated amongst each other to generate plurality of synthetically labelled documents.

FIG. 6B is a schematic illustration of an image 600 of a document page along with the plurality of synthetically generated documents 608. As shown, each individual field identified from the first set-of-field is associated with a corresponding individual field, either from a different instance of the first set-of-field or the individual field from the second set-of-field. Using this association multiple documents are synthetically generated and labelled, thereby generating plurality of synthetically labelled document 608. By association, in an embodiment of the invention, each individual field from the first instance of the first set-of-field is associated with the second set-of-field to generate a synthetically labelled document. Similarly, individual field from the second instance of the first set-of-field is associated with the second set-of-fields and a different synthetically labelled document is generated. It should be noted that, this can be repeated for each instance of the first and second set-of-fields using each individual field. Thus, using a one-to-many relationship between the plurality of set-of-fields, each individual field and the multiple instances of the plurality of set-of-fields, large number of synthetically labeled documents are generated for training purposes.

FIG. 7 is a schematic illustration of creating a structured data from the first set-of-fields, the second set-of-fields and individual fields. As shown in the figure, the output from the post processing module is analyzed and individual fields identified as described in reference to FIG. 5. The identified individual fields are then populated as column headings of a tabular structured data, as illustrated in 706. The individual fields like, claim number, class code, occupation, date of injury etc., have been illustrated as an example column heading. The value pertaining to the claim number 702a from the first instance of the first set-of-fields is then identified based on the text recognized from the OCR module and populated as a first row in the structured data. Subsequent instances of the claim number value 702b from the plurality of instances of the identified first set-of-fields is populated in subsequent rows of the structured data format.

As an illustrative example the second column has a heading of the individual field class code and the first and second rows are populated with class code values 704a and 704b from the first and second instance of the first set-of-fields. All the individual fields identified by the stitched output of the custom object detection module and the OCR module are populated as subsequent column headings and the corresponding value associated with the first and second instance are populated as values in respective rows. It should be noted that the individual fields from the second set-of-fields and/or the third, fourth set-of-fields, if identified, based on the layout of the document page are also populated as column headings, with the corresponding rows pertaining to the values from each of the instance of the respective set-of-fields. Thus, a tabular structure data format is created from unstructured and semi-structured images of document pages.

The systems and methods described herein can be implemented using one or more computing devices. In some embodiments, the system elements could be combined into a single hardware device or separated into multiple hardware devices. The methods can be implemented in a computer program product accessible from a computer-usable or computer-readable storage medium that provides program code for use by a computer or any instruction execution system. A computer-usable or computer-readable storage medium can be any apparatus that can contain or store the program for use by a computer or instruction execution system.

A data processing system suitable for storing and/or executing the corresponding program code can include at least one processor coupled to computerized data storage devices such as memory elements. Network adapters may also be coupled to the system to enable the data processing system to become coupled to other data processing systems or storage devices via private or public networks. To provide for interaction with a user, the features can be implemented on a computer with a display device, such as a CRT (cathode ray tube), LCD (liquid crystal display), or another type of monitor for displaying information to the user, a keyboard, and an input device, such as a mouse or trackball by which the user can provide input to the computer.

Suitable processors for the execution of a program of instructions include, but are not limited to, general and special purpose microprocessors. A processor may receive and store instructions and data from a computerized data storage device such as a read-only memory, a random-access memory, or any combination of the data storage devices. A processor may include any processing circuitry or control circuitry operative to control the operations and performance of an electronic device. The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory.

While one or more embodiments disclosed herein have been described, various alterations, additions, permutations, and equivalents thereof are included within the scope of the disclosed embodiments.

The invention claimed is:

1. A method for data extraction and standardization of data from unstructured and semi-structured document page images comprising:

detecting boundaries of one or more instances of a first set-of-fields from images of an original document pages;

detecting boundaries of one or more instances of a second set-of-fields from the images of the original document pages;

wherein the images of the original document pages include images of an unstructured document pages, images of a semi-structured document pages, images of a structured document pages, images of a web pages;

tagging using unique labels, the detected boundaries of the one or more instances of the first set-of-fields and the one or more instances of the second set-of-fields;

identifying each individual field from the one or more instances of the first set-of- fields and the one or more instances of the second set-of-fields;

generating plurality of synthetic labelled documents using each individual field from the one or more instances of the first set-of-fields, one or more instances of the second set-of-fields and the unique labels; p1 training a neural network model using the generated plurality of synthetic labelled documents along with the images of the original document pages;

identifying in real time, one or more instances of the first set-of-fields and one or more instances of the second set-of-fields using the trained neural network model;

recognizing text from the images of unstructured and semi-structured document pages;

associating the recognized text to each individual field in the one or more instances of the first set-of-fields and the one or more instances of the second set-of-fields; and creating a standardized structured data based on the association.

2. The method of claim 1, wherein the unstructured and semi-structured documents comprises, document page images pertaining to loss run documents, document page images from banking documents, document page images from insurance industry.

3. The method of claim 1, wherein generating the plurality of synthetic labelled documents comprises establishing a one-to-many relationship between each individual field from the one or more instances of the first set-of-fields.

4. The method of claim 1, wherein generating the plurality of synthetic labelled documents comprises establishing a one-to-many relationship between each individual field from the one or more instances of the first set-of-fields and the one or more instance of the second set-of-fields.

5. The method of claim 1, wherein each individual field comprises name, age, gender, occupation, claim no, class code, date of injury, date reported to carrier, close date, body part, nature of injury, cause, location, medical, indemnity, rehab, paid, reserved.

6. The method of claim 1, wherein identifying in real time comprises, identifying the first and the second set-of fields from a new document page images provided as input to the neural network model.

7. The method of claim 1, wherein the first set-of-fields and the second set-of-fields is a subset of an overall set-of-fields available in an image of the original document pages images.

8. The method of claim 1, wherein detecting boundaries of one or more instances of the first and second set-of-fields comprises, detecting repetition of the first set-of-fields and the second set-of-fields, more than once in the images of the original document pages.

9. A system for data extraction and standardization of data from unstructured and semi-structured documents page images comprises;

a training framework;

wherein the training framework comprises a document repository module, a tagging module, a synthetic data generation module and a neural network model;

wherein the document repository module stores images of an original document pages including images of an unstructured document pages, images of a semi-structured document pages, images of a structured document pages, images of web pages;

wherein the tagging module is configured to tag using unique labels a first set-of-fields and a second set-of-fields from the images of the original document pages;

wherein the synthetic data generator module is configured to generate plurality of synthetically labelled documents from the first set-of-fields, the second set-of-fields and the unique labels;

wherein the neural network model is trained using the generated plurality of synthetically labelled documents along with the images of the original document pages;

an inference framework;

wherein the inference framework comprises a custom object detection module, an Optical Character Recognition (OCR) module, a post processing module and a data standardization module;

wherein the custom object detection module is configured to identify one or more instances of the first set-of-fields and one or more instances of the second set-of-fields using the trained neural network model;

wherein the OCR module is configured to recognize text from the images of unstructured and semi-structured document pages;

wherein the post processing module is configured to stitch together the output of the custom object detection module and the OCR module;

wherein the data standardization module is configured to use the stitched output from the post processing module to create a standardized structured data.

10. The system of claim 9, wherein the synthetic data generator module establishes a one-to-many relationship between each individual field in the first set-of-fields to generate the plurality of synthetically labelled documents.

11. The system of claim 9, wherein the synthetic data generator module establishes a one-to-many relationship between each individual field in the first set-of-fields and each individual field in the second set-of-fields to generate the plurality of synthetically labelled documents.

12. The system of claim 9, wherein the post processing module stitches the output by, associating the recognized text from the OCR module to each individual field in the one or more instances of the first set-of-fields and the one or more instances of the second set-of-fields.

13. The system of claim 9, wherein the data standardization module is configured to create the standardized structured data using the association between the recognized text and each individual field from the one or more instances of the first set-of-fields and the one or more instances of the second set-of-fields.

14. A non-transitory computer readable storage medium having computer executable instructions for execution on a computer system, that when executed by a computer causes the computer system to execute the method of data extraction and standardization comprising;

detecting boundaries of one or more instances of a first set-of-fields from images of an original document pages;

detecting boundaries of one or more instances of a second set-of-fields from the images of the original document pages;

wherein the images of the original document pages include images of an unstructured document pages, images of a semi-structured document pages, images of a structured document pages, images of web pages;

providing an interface to tag the detected boundaries of the one or more instances of the first set-of-fields and the one or more instances of second set-of-fields using unique labels;

identifying each individual field from the one or more instances of the first set-of-fields and the one or more instances of the second set-of-fields;

generating plurality of synthetic labelled documents using each individual field from the one or more instance of the first set-of-fields, one or more instance of the second set-of-fields and the unique labels;

training a neural network model using the generated plurality of synthetic labelled documents along with the images of the original document pages;

identifying in real time, one or more instances of the first set-of-fields and one or more instances of the second set-of-fields using the trained neural network model;

recognizing text from the images of unstructured and semi-structured document pages;

associating the recognized text to each individual field in the one or more instances of the first set-of-fields and the one or more instances of the second set-of-fields; and creating a standardized structured data based on the association.

15. The non-transitory computer readable storage medium of claim 14, wherein generating the plurality of synthetic labelled documents comprises establishing a one-to-many relationship between each individual field from the one or more instances of the first set-of-fields.

16. The non-transitory computer readable storage medium of claim 14, wherein generating the plurality of synthetic labelled documents comprises establishing a one-to-many relationship between each individual field from the one or more instances of first set-of-fields and the one or more instances of the second set-of-fields.

17. The non-transitory computer readable storage medium of claim 14, wherein the first set-of-fields and the second set-of-fields is a subset of an overall set-of-fields available in an image of the original document pages images.

18. The non-transitory computer readable storage medium of claim 14, wherein detecting boundaries of one or more instances of the first and second set-of-fields comprises, detecting repetition of the first set-of-fields and the second set-of-fields, more than once in the images of the original document pages.

* * * * *